United States Patent
Lee (10) Patent No.: US 8,031,675 B2
(45) Date of Patent: Oct. 4, 2011

(54) SYSTEM AND METHOD FOR DETECTING WIRELESS BASE STATIONS

(75) Inventor: Hsin-Yi Lee, Hsinchu (TW)

(73) Assignee: Ralink Technology Corp., Hsinchu (TW)

( * ) Notice: Subject to any disclaimer, the term of this patent is extended or adjusted under 35 U.S.C. 154(b) by 466 days.

(21) Appl. No.: 12/391,342

(22) Filed: Feb. 24, 2009

(65) Prior Publication Data

US 2009/0238161 A1    Sep. 24, 2009

(30) Foreign Application Priority Data

Mar. 24, 2008 (TW) ................................ 97110330 A (51) Int. Cl.
*H04W 4/00* (2009.01)
*H04L 12/28* (2006.01)
*H04J 3/00* (2006.01)

(52) U.S. Cl. .................. 370/331; 370/431; 370/464

(58) Field of Classification Search ............ 370/329, 370/331, 431, 464–465, 495.2

See application file for complete search history.

(56) References Cited

U.S. PATENT DOCUMENTS

| 5,651,007 | A  | * | 7/1997 | Warren et al. | 370/431 |
| 6,738,370 | B2 | * | 5/2004 | Ostman | 370/349 |
| 7,009,948 | B1 | * | 3/2006 | Carlsson et al. | 370/329 |
| 7,046,645 | B1 | * | 5/2006 | Matsuyama | 370/329 |

FOREIGN PATENT DOCUMENTS

TW    285487 B    8/2007

* cited by examiner

*Primary Examiner* — Warner Wong
(74) *Attorney, Agent, or Firm* — Pearne & Gordon LLP (57) ABSTRACT

A system for detecting wireless base stations and a method thereof are provided. The system includes a detection module, a count module, a storage module, and a switch module. The method includes sending a detection request to a channel, determining whether a wireless base station corresponding to the channel physically exits, and whether the channel is detected, based on a detection response returned by the channel; returning a detection response; calculating the sum of the detection request and the detection response so as to create a count result to be stored in the storage module; and switching directly from the wireless base station currently in use and the corresponding channel to the next undetected channel and a corresponding wireless base station, based on the count result.

11 Claims, 6 Drawing Sheets

SYSTEM AND METHOD FOR DETECTING WIRELESS BASE STATIONS

BACKGROUND OF THE INVENTION

1. Field of the Invention

The present invention generally relates to a wireless base station detection technique, and more particularly, to a system and method for detecting wireless base stations on the information-processing platform.

2. Description of Related Art

In the conventional node detection technique, the detection request is repeatedly sent so as for the information-processing platform (computer) to detect beacons or wireless base station within a short time, and the detection request often halts on every channel, and the wireless base station responds with packets to continuously return the detection response. However, in the conventional technique, it is difficult to reduce the number of the base stations required and detections sent by base stations in terms of issuing of detection requests and to lower the wasted traveling time required by the packets due to continuous detections. Further, since the bandwidth is occupied over a long period of time due to continuous detections, the downloading and uploading efficiencies of the WLAN are decreased significantly.

In addition, the detection requests to be transmitted and the detection responses to be received are increased in response to the increased number of the wireless base stations, thereby disadvantaging the integrations of packets and leading to insufficient network bandwidth.

Furthermore, even if more information-processing platforms are added, each information-processing platform still repeatedly sends the detection request to the wireless base station and its corresponding channel, and the wireless base station in turn returns the detection response to the information-processing platform. Therefore the cost is increased due to the time spent on the above repeating procedure.

Figure 1:
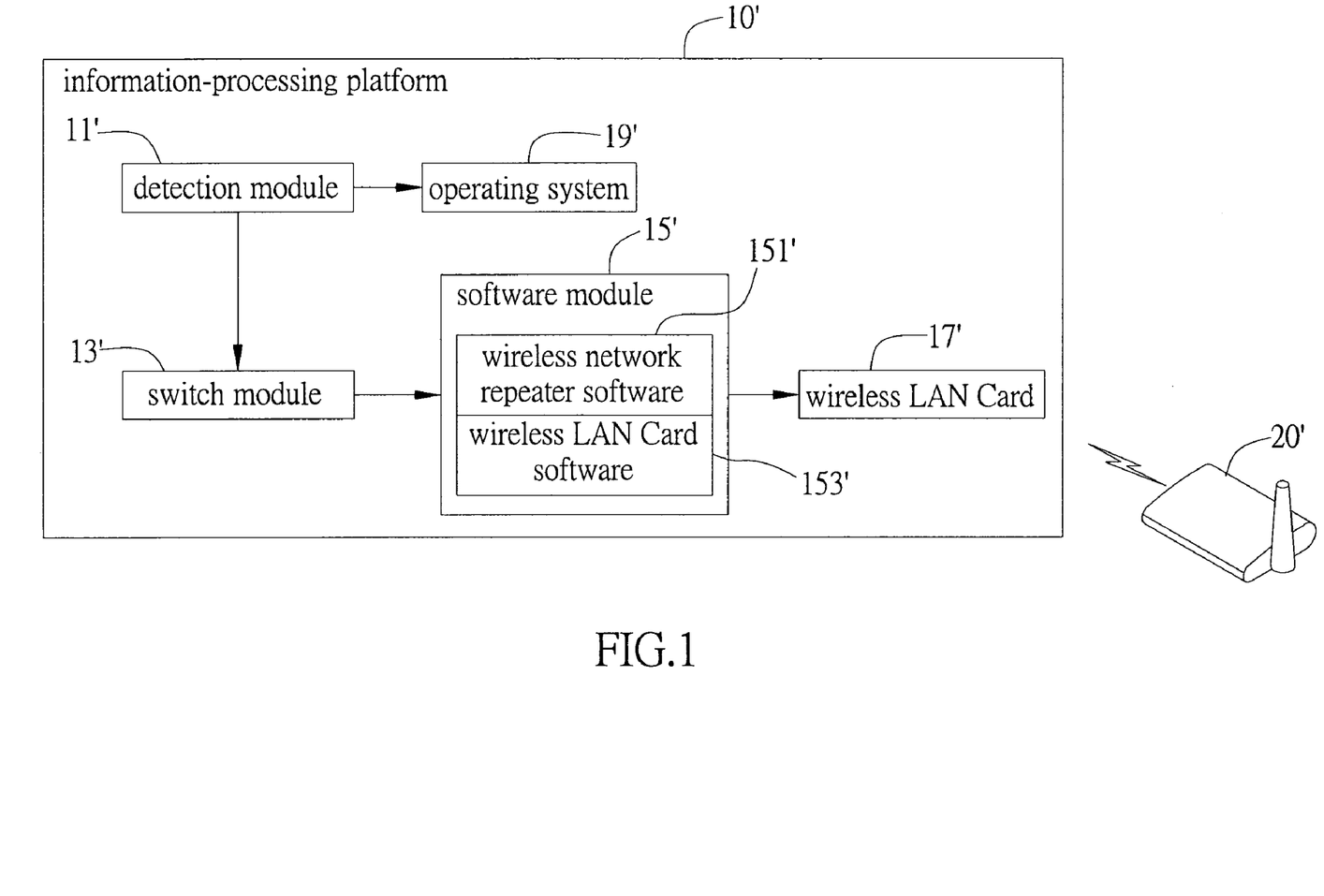
FIG. 1 illustrates a switching system of a wireless base station as disclosed in Taiwan Patent No. 12854487.

In order to overcome the above-mentioned problem, Taiwan Patent No. 12854487 discloses a system and method for expanding the service range of the wireless base station. FIG. 1 illustrates the conventional switching system in a wireless base station, wherein the wireless LAN Card, with the embedded switching system and method, expands the wireless base station service range. Idle wireless LAN card switches itself to function as a wireless network repeater in order to expand the service range of the wireless base station.

As shown in FIG. 1, the information-processing platform 10' includes a wireless LAN Card 17', wherein the information-processing platform 10' are connected to the wireless base station 20' via the wireless LAN Card 17'. The information-processing platform 10' is a computer, personal digital assistance (PDA) or other equivalent data equipment. On the information-processing platform 10', the wireless LAN Card 17' with software upgrade provides a switching system, so as for the wireless LAN Card 17' to switch between functions of wireless network repeater and wireless LAN Card in accordance with the actual situation.

The conventional switching system includes a detection module 11', a switch module 13' and a software module 15', wherein the detection module 11' judges whether the internal operating system 19' of the information-processing platform 10' contains software applications to provide Internet services. The application is one selected from a group consisting of web browser, e-mail applications and other software using the wireless LAN Card. The state (IDLE/ACTIVE) of the wireless LAN Card 17' is obtained according to the judgment generated by the detection module 11'. The switch module 13' provides the wireless LAN Card 17' with a switching system based on the judgment of the detection module 11', so as for the wireless LAN Card 17' to switch between the functions of wireless network repeater and wireless LAN Card in accordance with the actual situation.

The Internet application software is switched by the wireless LAN Card 17' to the function of the wireless network repeater when the wireless LAN Card 17' is idle without the need to connect to the Internet via the wireless LAN Card 17', thereby extending the service range of the wireless base station 20'. However, as the user requires wireless network connection via the wireless LAN Card 17' again, then the software corresponding to the wireless LAN Card 17' is resumed to perform various functions of the wireless LAN Card 17'. Therefore when the detection module 11' determines that the current information-processing platform 10' is executing applications for providing the Internet service, the switch module 13' switches the wireless LAN Card 17' to use the wireless LAN Card software 153'. When the detection module 11' determines that the current information-processing platform 10' is not executing the applications for providing the Internet service, the switch module 13' switches the wireless LAN Card 17' to use the wireless network repeater software 151'. Hence, the software is switched by the wireless LAN Card 17' without any manual operations, so as to switch the wireless LAN Card 17' between the wireless LAN Card 17' and the wireless network repeater.

The above-mentioned patent invention indeed switches the wireless LAN Card 17' to a state in which the wireless network repeater software 151' is used and achieves the switching efficiency of the wireless base station. However, when establishing a connection with the wireless base station, it is difficult to achieve speedy and hardly interrupted connection, as the above-mentioned prior art involves repeating transmissions of the detection request to the wireless base station 20' and waiting for the detection response, thereby wasting time and resources in packet transmissions. Also, the above-mentioned prior art does not solve the problem of bandwidth occupation.

Therefore, it has become a highly urgent issue in the wireless base station field to effectively solve the above conventional disadvantages, and to reduce the number of the wireless base stations installed as well as the time and resources required in detecting packet transmissions by the wireless base stations, so as to more efficiently use the network bandwidth.

SUMMARY OF THE INVENTION

In view of the disadvantages of the above-mentioned prior art, the present invention provides a method for lowering the WLAN detection requests that the information-processing platform initiated, so as to reduce the time cost in transmitting the detection responses by the wireless base station as well as repeated detections, thereby allowing the bandwidth to be used for more efficient in the wireless base station detection system and the method thereof.

In accordance with the present invention, a wireless base station detection system has a built-in count module installed on personal computers and notebooks. The wireless base station detection system at least includes: a detection module for sending a detection request packet through the channel, and determining, based on the detection response packet replied by the channel, whether the wireless base station corresponding to the channel physically exists and whether the channel is detected; a count module for summing up the detection request packets and the detection response packets to generate a count result containing messages indicating whether the channels are detected; a storage module for storing the detection request packets, the detection response packets and the count result; and a switch module for allowing, based on the count result, the wireless base station and its corresponding channel currently in use to ignore the detected channel, thereby switching to an undetected channel and its corresponding wireless base station.

The system of the present invention, prior to the information-processing platform switching to its supported channels, requires no further detection or repeat detection of the searched wireless base station to obtain the complete wireless base station report. Therefore, prior to the termination of node detections, the information-processing platform is allowed to skip processed channels and continue to detect other channels.

In addition, the present invention enables the corresponding wireless base station of a channel to know and record other wireless base stations on other channels. When an information-processing platform switches channels, the wireless base station responds its existence to the information-processing platform also and reports the existence of other wireless base stations as well as provides the information-processing platform with reports regarding the integration and storage of wireless base station. The information-processing platform, after completing all node detections, will switch to its other supported channels for further detections.

In comparison to the conventional technique, the system and method for detecting wireless base station according to the present invention are able to reduce the time cost in demanding detection response from the wireless base station as well as repeating detections via methods such as lowering the detection request issued to the wireless base station from the information-processing platform, thereby allowing the bandwidth to be efficiently used for other tasks as well as a flexible design of the system structure.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification.

FIGS. 2 to 7 are diagrams illustrating the wireless base station detection system according to the preferred embodiments of the present invention. In the following embodiments, the described information-processing platform is explained by giving an example such as a computer, which is one selected from a group consisting of personal computer, notebook and workstation. Electronic devices such as personal digital assistance (PDA), personal computer and notebook (NB) fall in the application scope of the present invention, and are not only limited to the computer application as described in the present preferred embodiment.

Figure 2:
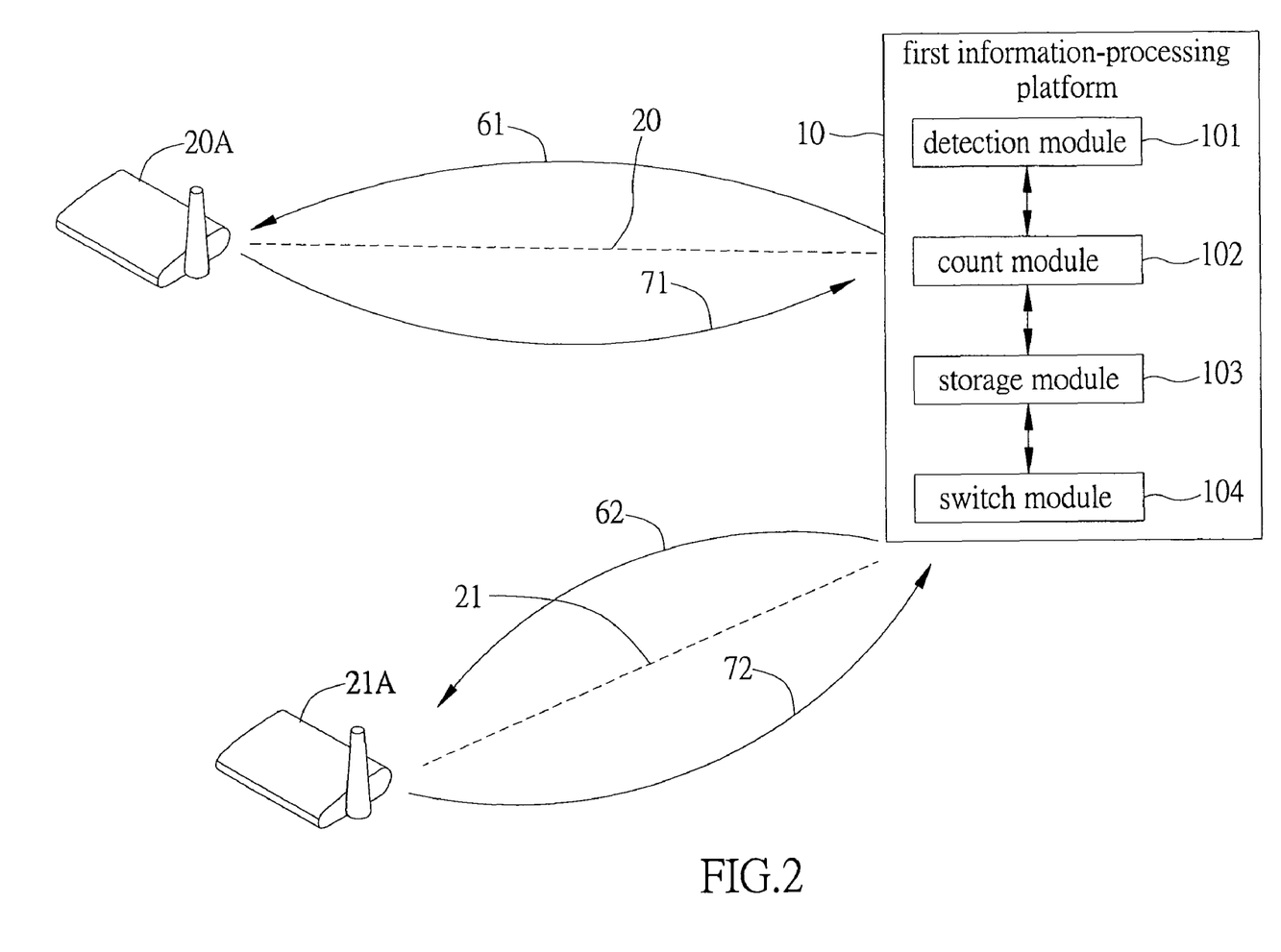
FIG. 2 is a diagram illustrating a first information-processing platform switching detections of the wireless base stations for the first time according to an embodiment of the present invention.

FIG. 2 shows the diagram illustrating a first information-processing platform switching detections of the wireless base station for the first time according to the embodiment of the present invention. The present embodiment is used on a first information-processing system 10, wherein the computer is used as an example. The wireless base station detection system of the present invention includes a detection module 101 for sending a detection request packet to a first channel 20 and a second channel 21, and determining, based on the detection response packet replied by the first channel 20 and the second channel 21, whether a first wireless base station 20A and a second wireless base station 21A corresponding to their respective channels physically exist and whether the first channel 20 and the second channel 21 have been detected. The wireless base station detection system of the present invention includes a count module 102 for summing up the detection request packets and the detection response packets to generate a count result containing messages indicating whether the channels are detected. Further, The wireless base station detection system of the present invention includes a storage module 103 for storing the detection request packets, the detection response packets and the count result; and includes a switch module 104 for allowing, based on the count result, the first wireless base station 20A and the second wireless base station 21A currently in use as well as their corresponding first channel 20 and second channel 21 to ignore the detected channel, thereby switching to the corresponding first wireless base station 20A and second wireless base station 21A of the next undetected first channel 20 and second channel 21.

In particular, the detection module 101 does not limit the number of detections of the corresponding first channel 20 and second channel 21 of the first wireless base station 20A and the second wireless base station 21A. The information-processing platform 10 collects and records the packets transmitted by the first wireless base station 20A and the second wireless base station 21A. In addition, when the detection module 101 of the first information-processing platform 10 performs node detection, the initial timing value of the count module 102 on the first information-processing platform 10 is set to 0 second. The detection module 101 of the first information-processing platform 10 transmits the detection request 61 for the first channel 20. The first information-processing platform 10 obtains packets of the detection response 71 transmitted by the first wireless base station 20A. The packets are integrated into the wireless base station report which is in turn saved in the storage module 103. The first information-processing platform 10 is switched to the second channel 21 by the switch module 104. The detection module 101 of the first information-processing platform 10 transmits packets of the detection request 62 of the second channel 21, and the first information-processing platform 10 transmits packets of the detection response 71 obtained previously from the first wireless base station 20A to the second wireless base station 21A of the second channel 21. After the second wireless base station 21A of the second channel 21 obtains the detection request 62, the second wireless base station 21A transmits packets of the detection response 72 to the first information-processing platform 10. The first information-processing platform 10 receives packets sent from the second wireless base station 21A and the packets are integrated into the wireless base station report which is in turn saved in the storage module 103. The data of the first wireless base station 20A and the second wireless base station 21A are listed in the report. When the second wireless base station 21A returns the packet of the first wireless base station 20A and the second wireless base station 21A, the timing values are all 0 second.

Figure 3:
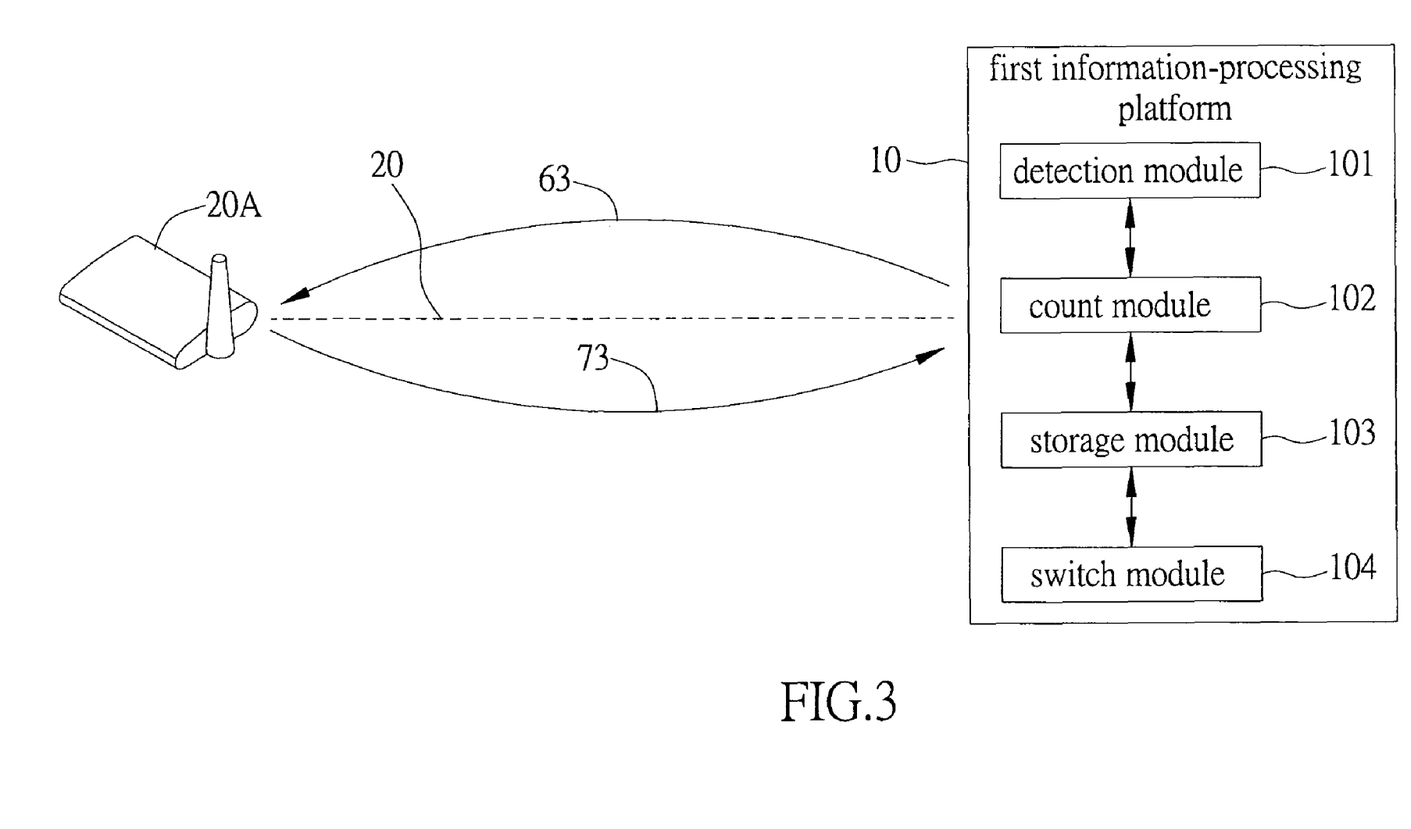
FIG. 3 illustrates the first information-processing platform switching detections of the wireless base station for the second time according to the embodiment of the present invention.

FIG. 3 illustrates the first information-processing platform switching detections of the wireless base station for the second time according to the embodiment of the present invention. In the present embodiment, when the timing value of the count module 102 on the first information-processing platform 10 reaches the predetermined timing (for example: 60 seconds), the detection module 101 of the first information-processing platform 10 performs node detection request again. The first information-processing platform 10 defines the initial timing value of the count module 102 as the predetermined timing (for example: 60 seconds) and transmits packets to the first wireless base station 20A. The first wireless base station 20A returns the detection response 73 packet containing the information of the first wireless base station 20A and the second wireless base station 21A loaded into the first information-processing platform 10 to the first information-processing platform 10. The first wireless base station 10 modifies the redetected timing value of the original first wireless base station 20A, wherein the predetermined timing (for example: 60 seconds) is reset to 0 second; the timing value of the second wireless base station 21A is still maintained at the predetermined timing (for example: 60 seconds). In particular, the first information-processing platform 10 is allowed to obtain the packets related to information of the second channel 21 of the second wireless base station 21A from the packets of the detection response 73 returned by the first wireless base station 20A and the packets are integrated into the report saved in the storage module 103, without having to switch to the second channel 21 via the switch module 104.

Figure 4:
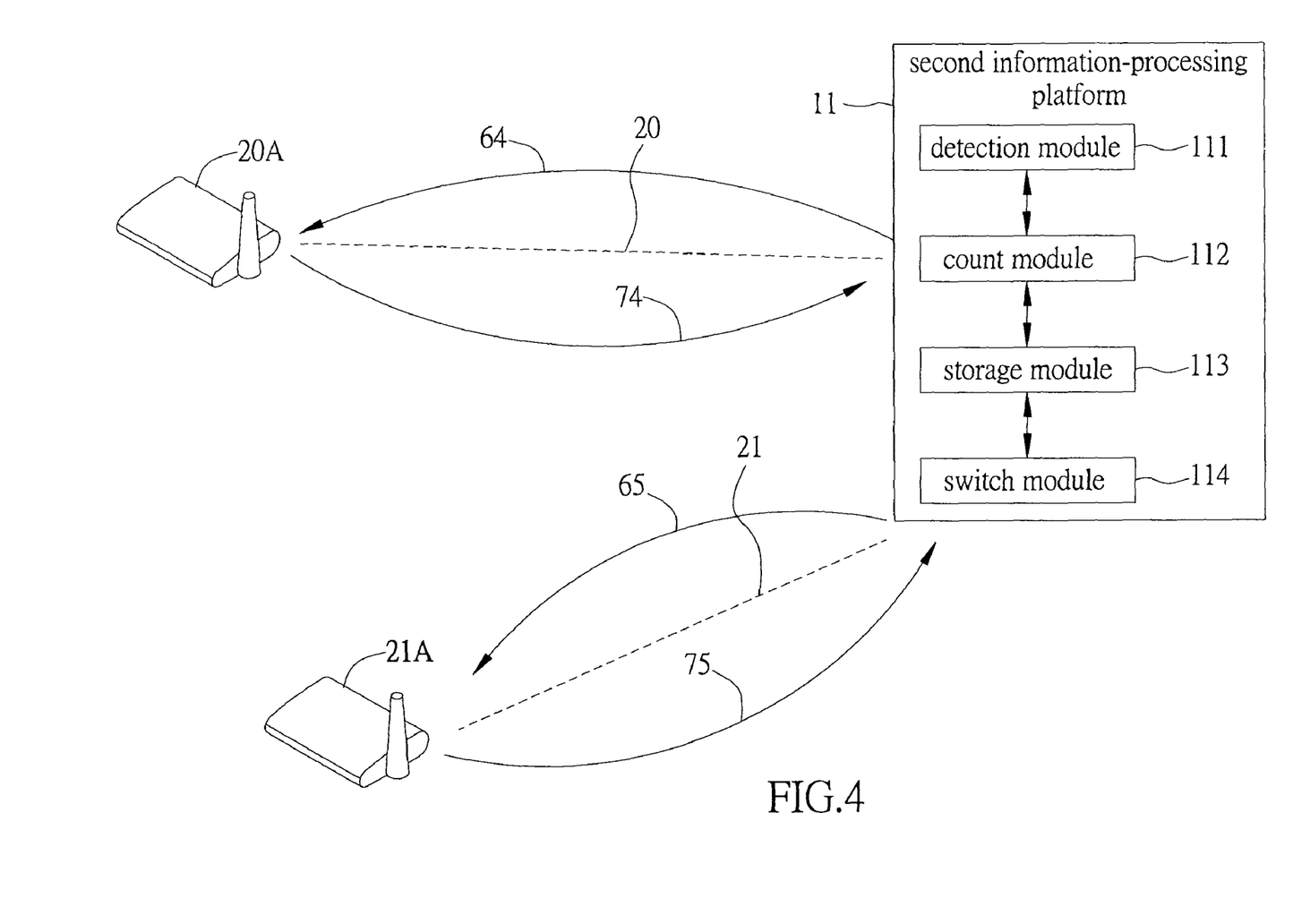
FIG. 4 is a diagram showing a second information-processing platform switching detections of the wireless base station according to the embodiment of the present invention.

FIG. 4 is a diagram showing the second information-processing platform switching detections of the wireless base station according to the embodiment of the present invention. When the timing value of the count module 112 on the second information-processing platform 11 is progressed to the predetermined value (for example: 110 seconds), the second information-processing platform 11 then allows the detection module 111 to connect to the WLAN for node detection and the detection request 64 is then sent. When the timing value of the first wireless base station 20A is progressed to the predetermined timing (for example: 100 seconds), the stored packets on the first wireless base station 20A as well as the outdated timing value of the second wireless base station 21A are reset to 0 second wherein the value before reset is the predetermined timing, and the detection response 74 is returned to the second information-processing platform 11. The second information-processing platform 11 is again switched to the second channel 21 via a switch module 114 in order to send out the detection request 65 to detect all the second wireless base stations 21A on the second channel 21, and the detection response 75 is retransmitted to the second information-processing platform 11 so as to be integrated into reports of the wireless base station which is saved in the storage module 113. In particular, as the detection modules 101 and 111 of the first information-processing platform 10, the second information-processing platform 11 or other information-processing platforms start the node detection and decide to detect the second channel 21 prior to detecting the first channel 20, each of the information-processing platforms 10 and 11 is allowed to skip the detection of the first channel 20 and detect the second channel 21 directly.

According to the above embodiments, the wireless base station detection system of the present invention has a wireless base station design that has no difference from the conventional technique without modifying the current functional structure of the wireless base station. The present invention also provides the method for decreasing the WLAN detection requests 61, 62, 63, 64 and 65 issued by the information-processing platforms 10 and 11 to reduce the time costs in demanding detection responses 71, 72, 73, 74 and 75 from the first wireless base station 20A and the second wireless base station 21A as well as the repeating detections, so that the bandwidth is used more efficiently, and the number of repeated detections is reduced. The design of wireless base station detection system of the present invention is more flexible than the conventional technique. Based on the above, it is known that the present invention has solved the inconvenience and disadvantages of the conventional technique.

According to the above wireless base station detection and the transmission mode, the main steps in the detection, transmission and receiving of the wireless base station detection system and the method according of the present invention are described as follows.

Figure 5:
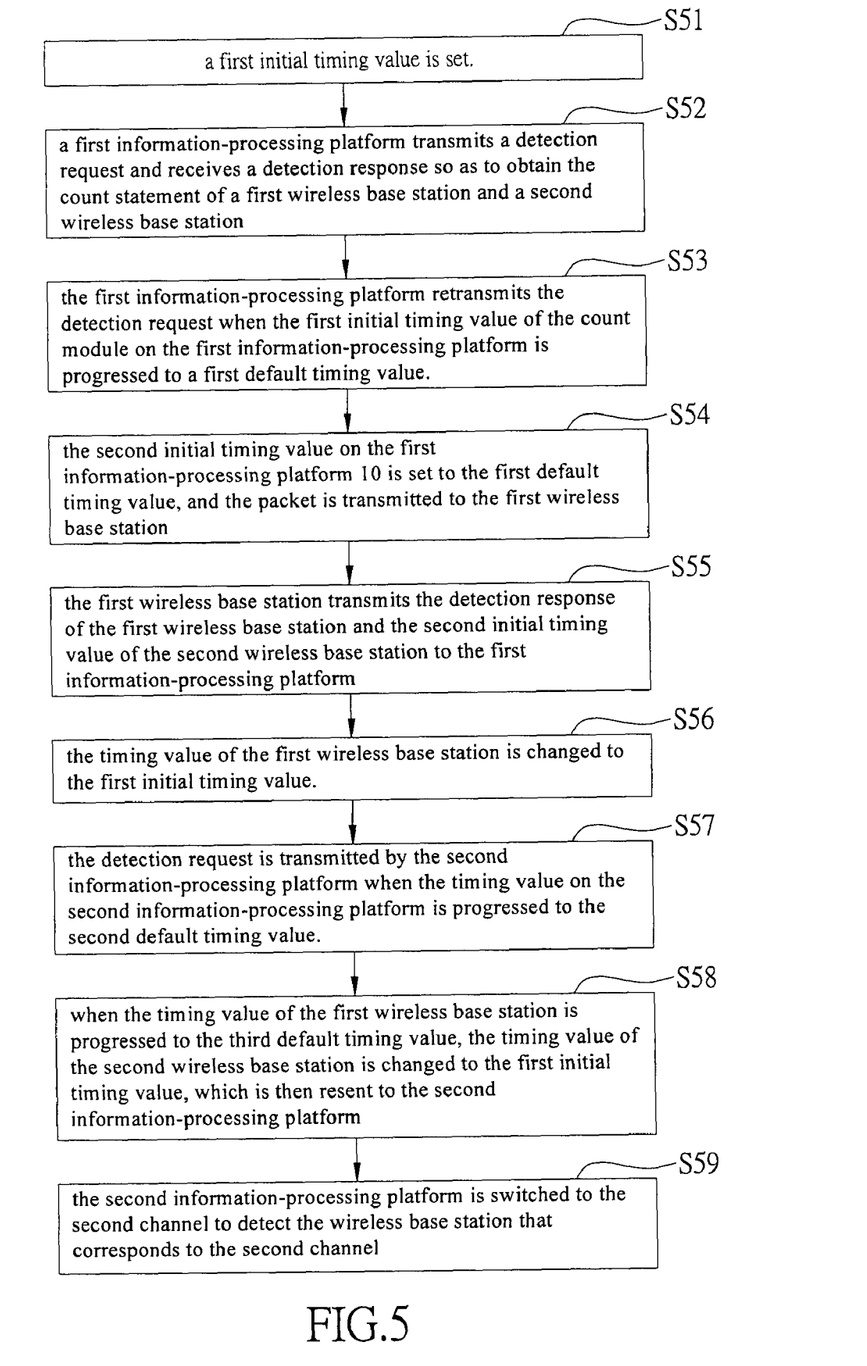
FIG. 5 is a flow chart showing the steps of detecting wireless base stations according to the present invention.

FIG. 5 is a flow chart showing the steps in detecting wireless base stations according to the present invention. In step 51, a first initial timing value is set.

In step 52, a first information-processing platform 10 transmits a detection request and receives a detection response so as to obtain the count result of a first wireless base station 20A and a second wireless base station 21A.

In step 53, the first information-processing platform 10 retransmits the detection request when the first initial timing value of the count module on the first information-processing platform 10 is progressed to a first predetermined timing value.

In step 54, the second initial timing value on the first information-processing platform 10 is set to the first predetermined timing value, and the packet is transmitted to the first wireless base station 20A.

In step 55, the first wireless base station 20A transmits the detection response of the first wireless base station 20A and the second initial timing value of the second wireless base station 21A to the first information-processing platform 10.

In step 56, the timing value of the first wireless base station 20A is changed to the first initial timing value.

In step 57, the detection request is transmitted by the second information-processing platform 11 when the timing value on the second information-processing platform 11 is progressed to the second predetermined timing value.

In step 58, when the timing value of the first wireless base station 20A is progressed to the third predetermined timing value, the timing value of the second wireless base station is changed to the first initial timing value, which is then resent to the second information-processing platform 11.

In step 59, the second information-processing platform 11 is switched to the second channel 21 to detect the wireless base station that corresponds to the second channel 21.

Figure 6:
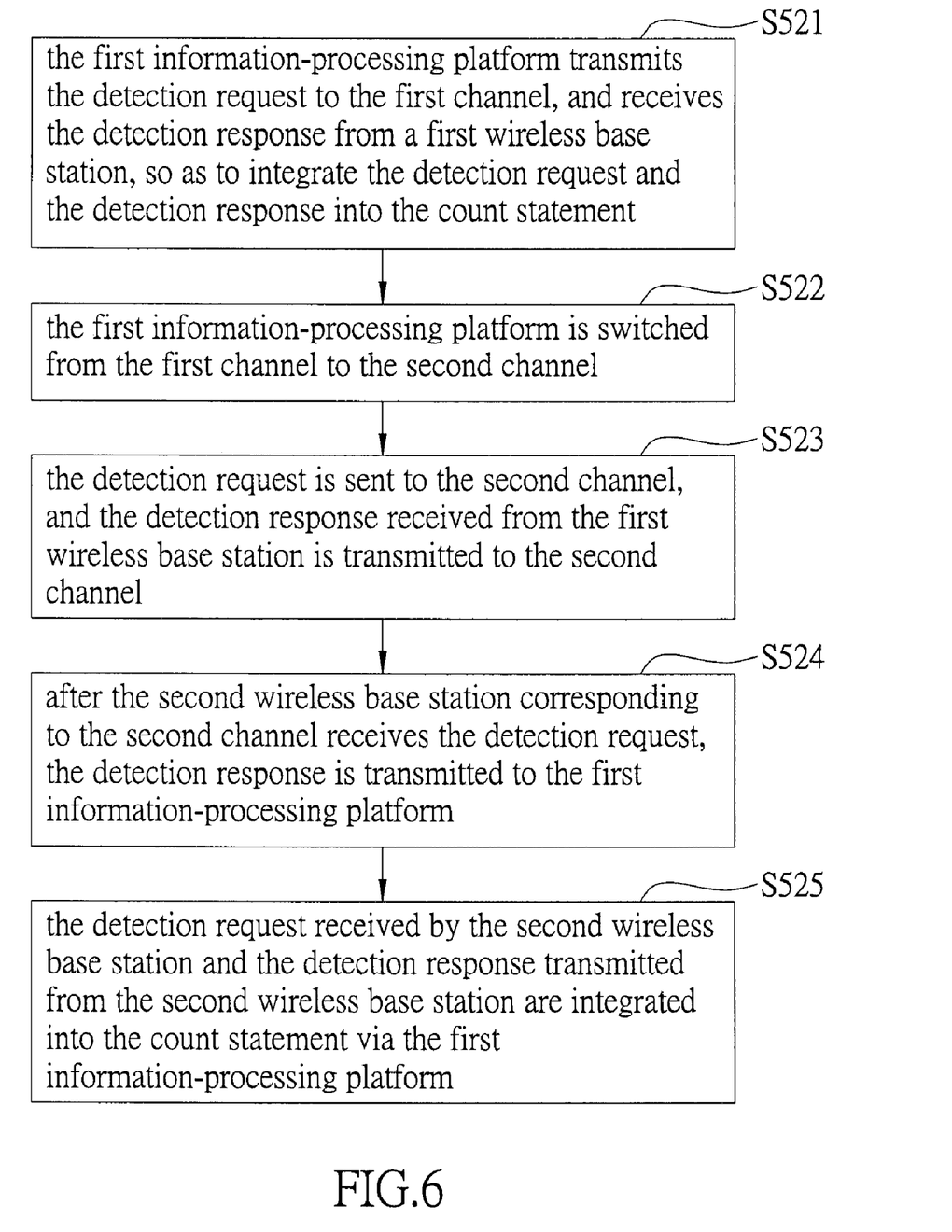
FIG. 6 is a flow chart illustrating Step 52 if detecting the wireless base station according to the embodiment of the present invention.

As depicted in FIG. 6, details of step 52 in switching detections of the wireless base station on the first information-processing platform 10 and the second information-processing platform 11 is illustrated, wherein step 52 includes steps 521-251.

In step 521, the first information-processing platform 10 transmits the detection request to the first channel 20, and receives the detection response from a first wireless base station 20A, so as to integrate the detection request and the detection response into the count result.

In step 522, the first information-processing platform 10 is switched from the first channel 20 to the second channel 21.

In step 523, the detection request is sent to the second channel 21, and the detection response received from the first wireless base station 20A is transmitted to the second channel 21.

In step 524, after the second wireless base station 21A corresponding to the second channel 21 receives the detection request, the detection response is transmitted to the first information-processing platform 10.

In step 525, the detection request received by the second wireless base station 21A and the detection response transmitted from the second wireless base station 21A are integrated into the count result via the first information-processing platform 10.

Accordingly, in the system and method for detecting wireless base station of the present invention, the time cost in responding to the wireless base station detection and repeating detections are reduced by lowering the detection request of the wireless base station sent by the information-processing platform, such that the bandwidth is efficiently used and the design of the system structure is flexible.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims. Hence the intellectual property protection of the present invention should be the appended claims listed below.

What is claimed is:

1. A system for detecting wireless base stations, wherein each of the wireless base stations corresponds to a channel, the system comprising:
    a detection module for sending a detection request packet to the channels, and determining whether the wireless base stations corresponding to the channels exist and whether the channels are detected based on a detection response packet replied from the channels;
    a count module for summing up the detection request packets and the detection response packets to generate a count result used to determine whether the channels are detected;
    a storage module for storing the detection request packets, the detection response packets and the count result; and
    a switch module for switching from a current channel and the corresponding wireless base station to an undetected channel and the corresponding wireless base station based on the count result, wherein a detected channel is ignored.

2. The system of claim 1, wherein the detection module is configured for performing one or a plurality of detections on the channels.

3. The system of claim 1, wherein the system works on an information-processing platform which mutually collects and records packets transmitted by another information-processing platform.

4. The system of claim 1, wherein one of the wireless base stations mutually collects and records packets transmitted by another one of the wireless base stations.

5. The system of claim 1, wherein the detection module is configured for, upon receiving a detection response replied from one of the wireless base stations, changing a detection frequency and request to another one of the wireless base stations and the corresponding channel.

6. The system of claim 5, wherein the detection module is configured for, based on the changed detection frequency and request, changing a request for repeated detections and the detection response of the wireless base stations.

7. The system of claim 3, wherein the information-processing platform is a computer.

8. A method for detecting wireless base stations, wherein one of the wireless base stations corresponds to one of channels, comprising the steps of:
    setting a first initial timing value for a count module of a first information-processing platform;
    obtaining a count result of a first wireless base station and a second wireless base station by transmitting a detection request and receiving a detection response;
    retransmitting the detection request when the first initial timing value reaches a first predetermined timing value;
    setting a second initial timing value as the first predetermined timing value, and transmitting a packet to the first wireless base station;
    transmitting the detection response of the first wireless base station and the second initial timing value of the second wireless base station from the first wireless base station to the first information-processing platform;
    changing a timing value of the first wireless base station to the first initial timing value;
    transmitting the detection request from a second information-processing platform when the timing value on the second information-processing platform reaches the second predetermined timing value;
    when the timing value of the first wireless base station reaches a third predetermined timing value, changing a timing value of the second wireless base station to the first initial timing value and re-transmit to the second information-processing platform; and
    switching the second information-processing platform to a second channel for detecting a wireless base station corresponding to the second channel.

9. The method of claim 8, wherein the step of obtaining a count result of a first wireless base station and a second wireless base station comprises steps of:
    sending the detection request to the first channel via the first information-processing platform, and integrating the detection request and the detection response into the count result after receiving the detection response transmitted by the first wireless base station corresponding to the first channel;
    switching the first information-processing platform from the first channel to the second channel;
    sending detection request to the second channel, and transmitting the detection response received from the first wireless base station to the second channel;
    transmitting the detection response to the first information-processing platform after the detection request is received by the second wireless base station corresponding to the second channel; and
    integrating the detection request received by the second wireless base station and the detection response transmitted from the second wireless base station into the count result by the first information-processing platform.

10. The method of claim 8, wherein the first information-processing platform or the second information-processing platform detects a wireless base station and its corresponding channel, and decides to detect the second channel before detecting the first channel, and then each information-processing platform skips the first channel and detects the second channel directly.

11. The method of claim 8, wherein the information-processing platform is a computer.

* * * * *